(12) United States Patent
Takahashi et al.

(10) Patent No.: US 6,209,713 B1
(45) Date of Patent: Apr. 3, 2001

(54) PART TRANSFER APPARATUS

(75) Inventors: Shigeki Takahashi; Nihei Kaishita; Akira Nemoto, all of Omihachiman (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 0 days.

(21) Appl. No.: 09/339,040

(22) Filed: Jun. 23, 1999

(30) Foreign Application Priority Data

Jul. 1, 1998 (JP) ................................................ 10-185517

(51) Int. Cl.[7] .................................................. B65G 25/04
(52) U.S. Cl. ...................................... 198/750.8; 198/750.1
(58) Field of Search ............................. 198/750.1, 750.2, 198/750.8

(56) References Cited

FOREIGN PATENT DOCUMENTS

| 1565664 | * | 3/1968 | (FR) | ................................... 198/750.8 |
| 672352 | * | 5/1952 | (GB) | ................................... 198/750.8 |
| 8-48419 | | 2/1996 | (JP) | . |

\* cited by examiner

*Primary Examiner*—James R. Bidwell
(74) *Attorney, Agent, or Firm*—Burns, Doane, Swecker & Mathis, LLP

(57) ABSTRACT

A part transfer apparatus includes a guide groove for aligning and guiding parts, a blade placed at the bottom of the guide groove so as to move forward and backward in the direction of the groove, and a driving device for reciprocally driving the blade so that the speed of backward movement of the blade is higher than the speed of forward movement. The part transfer apparatus conveys the parts forward by using the difference in frictional force. The driving device includes a cam, and a cam lever having a cam follower in contact with the peripheral surface of the cam. The rear end of the blade is in contact with the front side of the cam lever. Since the rotational motion of the cam is converted into the pivotal motion of the cam lever, and further into the reciprocating motion of the blade, vertical force hardly acts on the blade, and vertical vibration of the blade is inhibited. This makes it possible to prevent parts laid on the blade from being lifted and popped off, and to thereby stably transfer the parts.

3 Claims, 6 Drawing Sheets

PART TRANSFER APPARATUS

BACKGROUND OF THE INVENTION

1. Field of the Invention

The present invention relates to a part transfer apparatus, and more particularly, to an apparatus for aligning and intermittently conveying parts.

2. Description of the Related Art

Hitherto, small parts, such as chip parts, have been transferred by, for example, a method in which parts are caused to slide down along a downwardly inclined groove for guiding parts by using potential energy, a method in which parts are fed by air pressure using compressed air or negative pressure, or a method in which an endless belt that forms a bottom face of a groove for conveyance is intermittently driven (e.g., Japanese Unexamined Patent Publication No. 8-48419).

The slide-down method has low reliability because parts are sometimes caught during travel due to contaminants thereon or static electricity. Although the air method simplifies the structure, it is sensitive to pressure changes. Furthermore, since an air pressure source is required, the cost is increased. In contrast, the belt drive method has a relatively high reliability, whereas a drive mechanism for intermittently driving the belt is complicated, and durability is apt to be lowered.

Accordingly, the present inventors have proposed a transfer apparatus that does not significantly damage parts and that provides high reliability and a simple structure (Japanese Patent Application No. 10-111671). The Japanese Patent Application No. 10-111671 has not been published yet. This transfer apparatus comprises a guide groove for aligning and transferring parts, a conveyor member placed at the bottom of the guide groove so as to move forward and backward in the direction of the groove, and a driving means for reciprocally driving the conveyor member so that the reverse speed of the conveyor member is higher than the advance speed, and the transfer apparatus conveys parts by using the difference in frictional force.

In such a transfer apparatus, a cam that is turned in one direction is provided as the driving means, a spring is provided to urge the conveyor member backward, and the rear end of the conveyor member is made to contact the peripheral surface of the cam, whereby the conveyor member can be reciprocally driven on the above-described condition. In this case, the structure of the driving means is substantially simplified, and the motion of the conveyor member can be freely set by changing the cam curve.

Since the cam and the conveyor member are in direct contact with each other, however, the force perpendicular to the moving direction of the conveyor member acts on the conveyor member, thereby vibrating the conveyor member vertically. This vibration lifts parts placed on the conveyor member, and thereby impairs transfer efficiency. Furthermore, since the amount of sliding between the peripheral surface of the cam and the conveyor member is large, and the conveyor member is pressed against the peripheral surface of the cam by the spring, both the members may undergo serious wear.

SUMMARY OF THE INVENTION

Accordingly, it is an object of the present invention to provide a part transfer apparatus that prevents vibration and wear of a conveyor member, and that achieves high transfer efficiency.

In order to achieve the above object, according to an aspect of the present invention, there is provided a part transfer apparatus, including a guide groove for aligning and guiding parts; a conveyor member disposed at the bottom of the guide groove so as to move forward and backward in the direction of the groove; and a driving means for conveying parts laid on the top face of the conveyor member forward by reciprocally driving the conveyor member so that the speed of backward movement is higher than the speed of forward movement, wherein the driving means includes a cam to be turned in a fixed direction, a pivoting cam lever in contact with the peripheral surface of the cam so as to convert the displacement of the peripheral surface of the cam into the forward and backward movement of the conveyor member, and a spring for urging the conveyor member or the cam lever backward.

When the cam is turned in a fixed direction, the cam lever runs onto a higher portion of the cam, the cam lever pivots forward, and the conveyor member engaged with the cam lever advances at low speed. For this reason, parts laid on the top face of the conveyor member are carried forward together with the conveyor member by the holding frictional force that acts between the conveyor member and the parts. When the cam turns further and the cam lever drops to a low portion of the cam, the cam lever pivots backward at high speed. Thereby, the conveyor member also reverses at high speed. Since the speed of reversing is higher than that of advancing, the parts slip relative to the conveyor member, only the conveyor member reverses, and the parts are held at the advanced position.

Since the cam lever is interposed between the cam and the conveyor member, the force perpendicular to the moving direction of the conveyor member hardly acts on the conveyor member, whereby the vertical vibration of the conveyor member is limited. This makes it possible to prevent parts laid on the conveyor member from being lifted, and to thereby improve transfer efficiency. Furthermore, since the conveyor member and the cam lever slide with respect to each other by a small amount, wear can be reduced, compared with a case in which the cam and the conveyor member are in direct contact with each other. By changing the contact point between the cam lever and the conveyor member, the stroke of the conveyor member can be changed even when the same cam is used, which provides a high degree of freedom of design.

In order to convert the displacement of the peripheral surface of the cam into forward and backward movement of the conveyor member via the cam lever, preferably, a spring is provided to urge the conveyor member backward so that the rear end of the conveyor member is made to contact the front side of the cam lever by the urging force of the spring. In this case, the structure is substantially simplified.

Preferably, one of the cam lever and the conveyor member has an engaging pin, the other has an engaging hole to be slidably engaged with the engaging pin, and a spring is provided to pivotally urge the cam lever backward. In this case, since a spring for urging the conveyor member backward is not required, load is not imposed on the connecting portion between the engaging pin and the engaging hole, which prevents the connecting portion from wear.

Further objects, features, and advantages of the present invention will become apparent from the following description of the preferred embodiments with reference to the attached drawings.

DESCRIPTION OF THE PREFERRED EMBODIMENTS

FIGS. 1 to 4 show a part transfer apparatus according to a first embodiment of the present invention. In this embodiment, for example, chip electronic parts are used as parts P.

Figure 1:
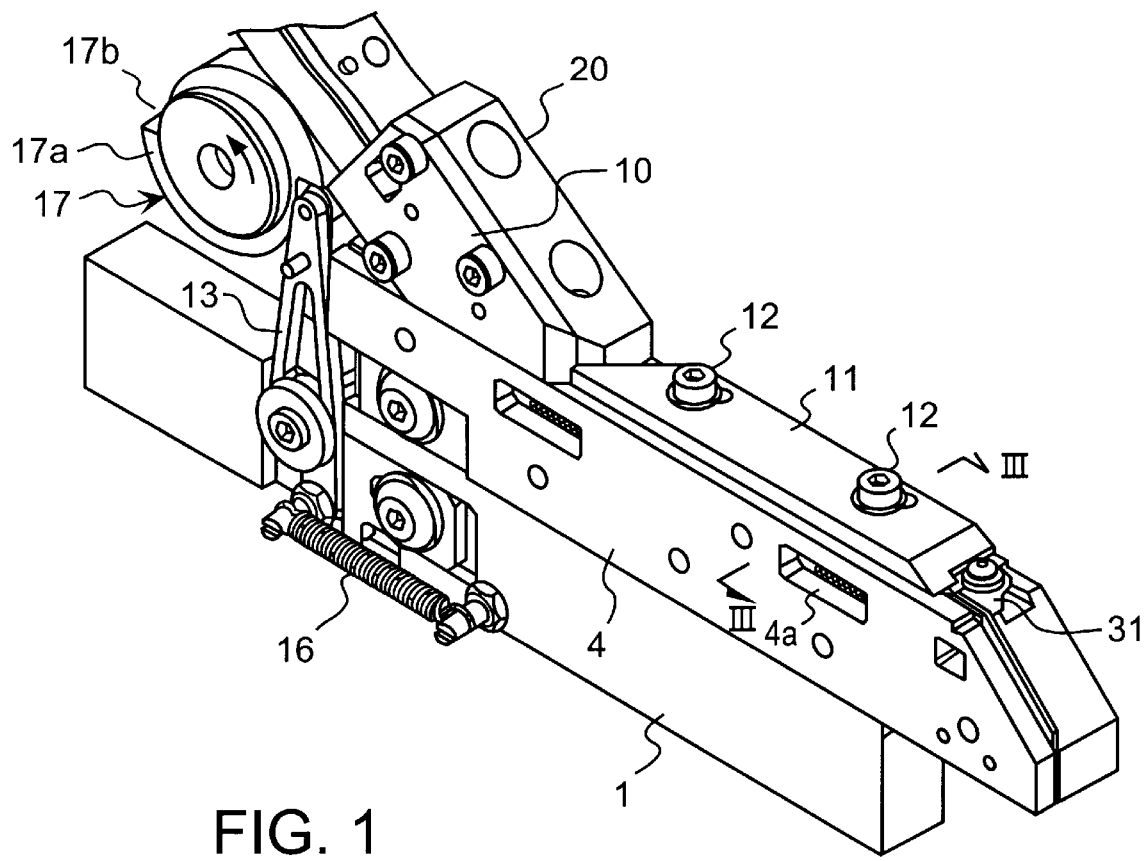
FIG. 1 is a perspective view of a part transfer apparatus according to a first embodiment of the present invention.
Figure 2:
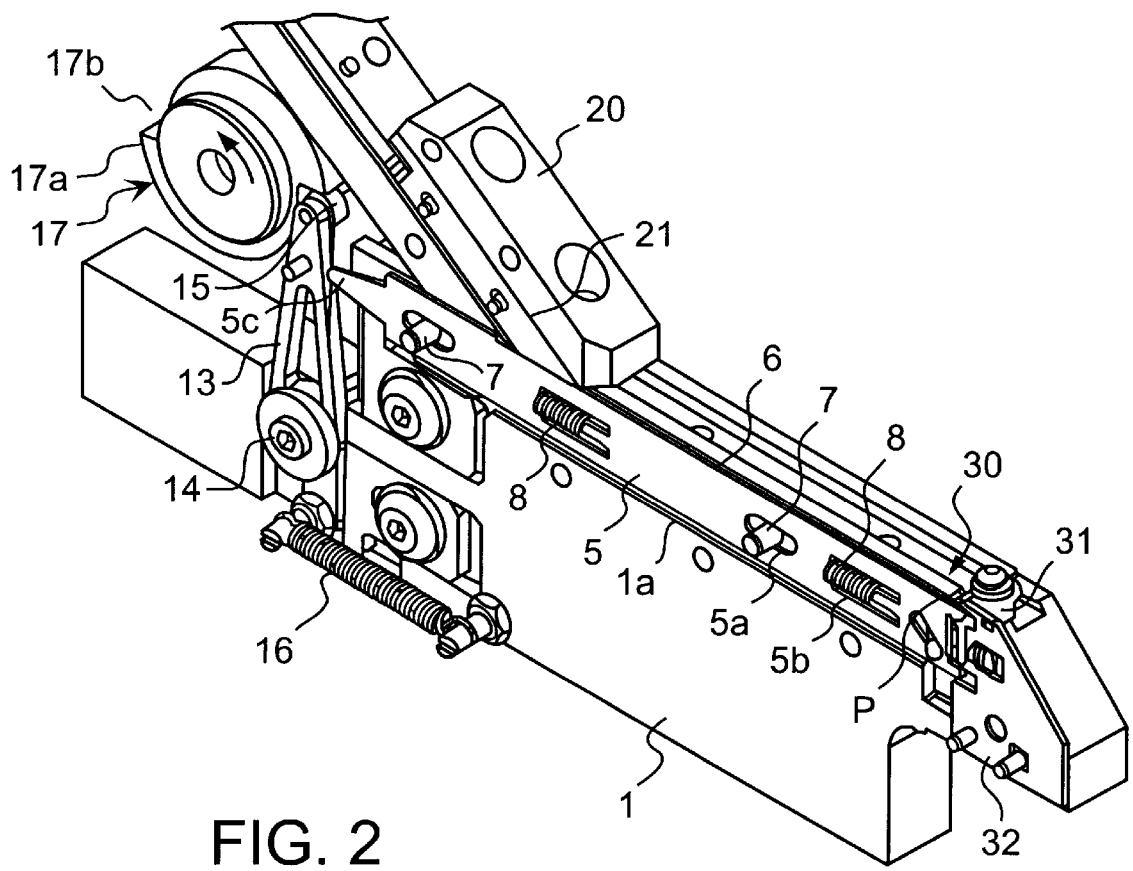
FIG. 2 is a perspective view of the part transfer apparatus shown in FIG. 1, from which front covers and a top cover are removed.

FIG. 1 is a general view of the part transfer apparatus, and FIG. 2 shows a state in which front covers 4 and 10 and a top cover 11, which will be described later, are removed from the apparatus.

Figure 3:
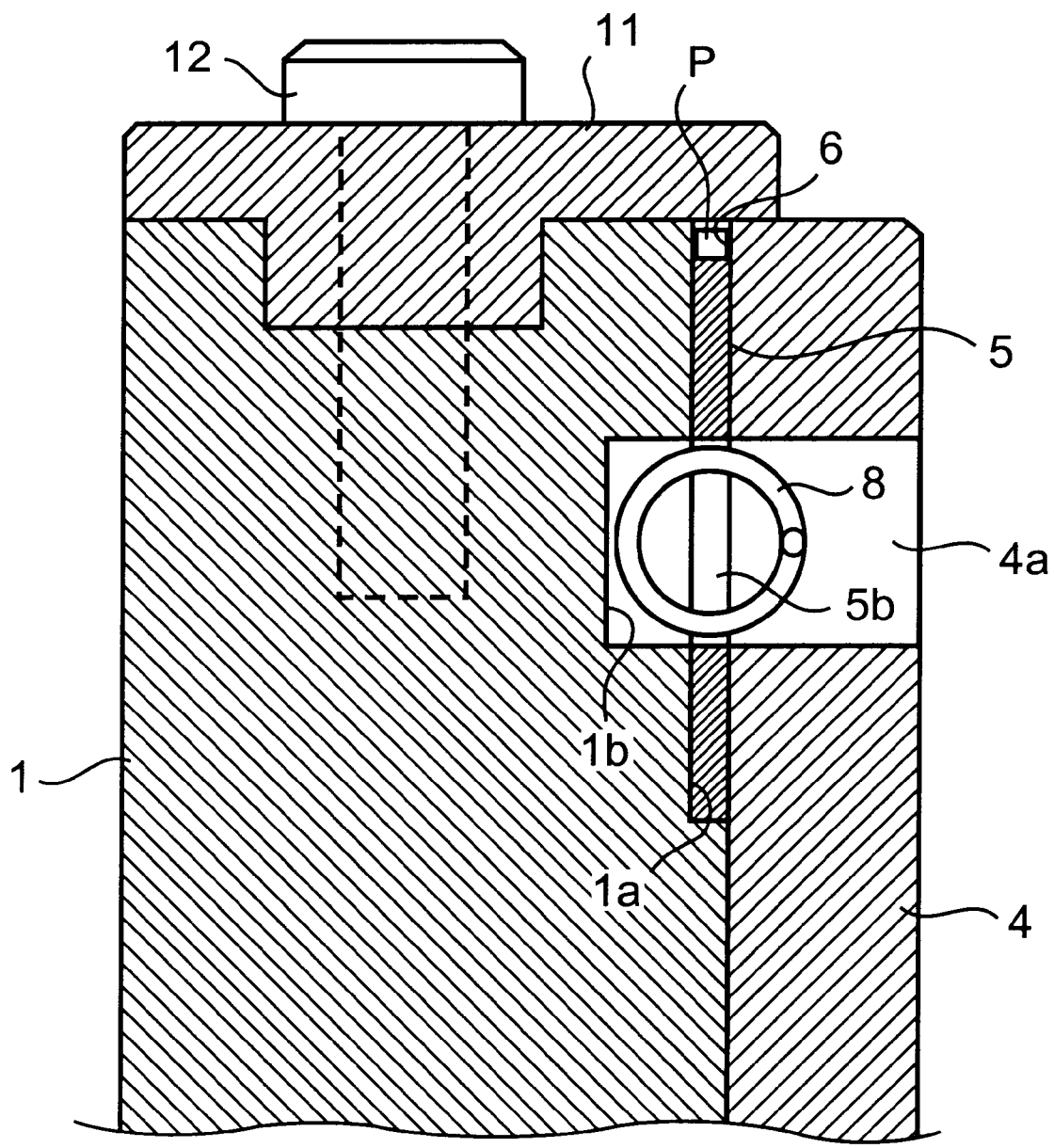
FIG. 3 is a cross-sectional view taken along line III—III of FIG. 1.

On the front face of a main body 1, a recessed portion 1a is formed, as shown in FIG. 3, and a narrow space is formed by fixing a front cover 4 to the front of the main body 1. Inside the space, a blade 5, an example of a conveyor member, is disposed to slide in the horizontal direction. A top cover 11 is fixed on the top face of the main body 1 by screws 12 so as to prevent parts P from falling off during conveyance. The inner side face of the recessed portion 1a, the inner side face of the front cover 4, the upper surface of the blade 5, and the lower surface of the top cover 11 define a guide groove 6 for aligning and guiding parts P therealong.

The blade 5 is formed of a thin metal plate, and is provided with slots 5a extending in the longitudinal direction, and spring storage holes 5b, as shown in FIG. 2. Guide pins 7 projecting from the main body 1 are passed through the slots 5a, thereby guiding the blade 5 in the longitudinal direction. Springs 8 are held inside the spring storage holes 5b. Both sides of the springs 8 in the radial direction are engaged with concave grooves 1bformed in the main body 1 and openings 4a formed in the front cover 4 (see FIG. 3). The springs 8 are supported at the rear end by the spring storage holes 5b, and are supported at the front end by the front end faces of the concave grooves 1b and the openings 4a, thereby continuously urging the blade 5 backward.

A rear end portion 5c of the blade 5 is placed in contact with the front side face of a cam lever 13, which is pivotally mounted on the main body 1, by the spring force of the springs 8. The cam lever 13 is pivotally supported at its center by a screw 14, is provided at its top end with a cam follower 15 in rolling contact with the peripheral surface of a cam 17, and is fixed at its bottom end to one end of a spring 16 that is fixed to the main body 1 at the other end. For this reason, the cam lever 13 is urged in a direction such that the cam follower 15 makes contact with the peripheral surface of the cam 17. The springs 8, the cam lever 13, and the cam 17 constitute a driving means for reciprocally driving the blade 5.

As shown in FIGS. 1 and 2, the cam 17 includes a high portion 17a and a low portion 17b, and is rotated at a fixed speed in the direction of the arrow by a driving device (not shown) such as a motor. Therefore, as the cam follower 15 of the cam lever 13 runs onto the high portion 17a of the cam 17, the blade 5 advances at low speed. When the cam follower 15 drops to the low portion 17b of the cam 17, the blade 5 reverses at high speed. The advance speed of the blade 5 is set at a speed at which a predetermined holding frictional force acts between the blade 5 and a part P placed on the top face thereof, according to the inclination of the high portion 17a of the cam 17, the rotation speed of the cam 17, the leverage of the cam lever 13, and the like. The reverse speed of the blade 5 is set at a speed at which the frictional force is substantially ineffective between the blade 5 and the part P placed on the top face thereof. In this way, since the blade 5 is advanced at low speed so as to cause the frictional force to act, and is reversed at high speed so as to make the frictional force ineffective, it is possible to transfer parts P in one direction without a special mechanism for inhibiting back feeding.

The speed at which the frictional force is ineffective includes not only a speed at which the frictional force does not act at all, but also a speed at which parts are not substantially reversed even when frictional force acts to an extent.

An aligning device 20 for aligning parts P is diagonally fixed on the top rear face of the main body 1. The aligning device 20 is provided with a chute groove 21 for allowing parts P to slide down along the slope thereof, and a front cover 10 fixed to cover the front of the chute groove 21. The bottom end of the chute groove 21 is connected to the rear end of the guide groove 6 so that parts P, which have slid in the chute groove 21, enter the guide groove 6. In this case, since there is a difference in angle between the chute groove 21 and the guide groove 6, a part placed at the bottom end of the chute groove 21 serves to prevent the parts in the guide groove 6 from moving backward.

Provided at the front end of the guide groove 6 are a separation mechanism 30 for separating the first part of the transferred parts from subsequent parts in order to take only the first part out of the guide groove 6, a movable stopper 31 for pushing the first part back in order to ensure a space between the first part and the second part when the first part cannot be taken out for some reason, a shutter 32 for closing the upper side of the first part until immediately before the first part is taken out of the guide groove 6, etc. A detailed description thereof is omitted.

The operation of the part transfer apparatus having the above-described configuration will be described with reference to FIGS. 4A to 4C.

Figure 4A:
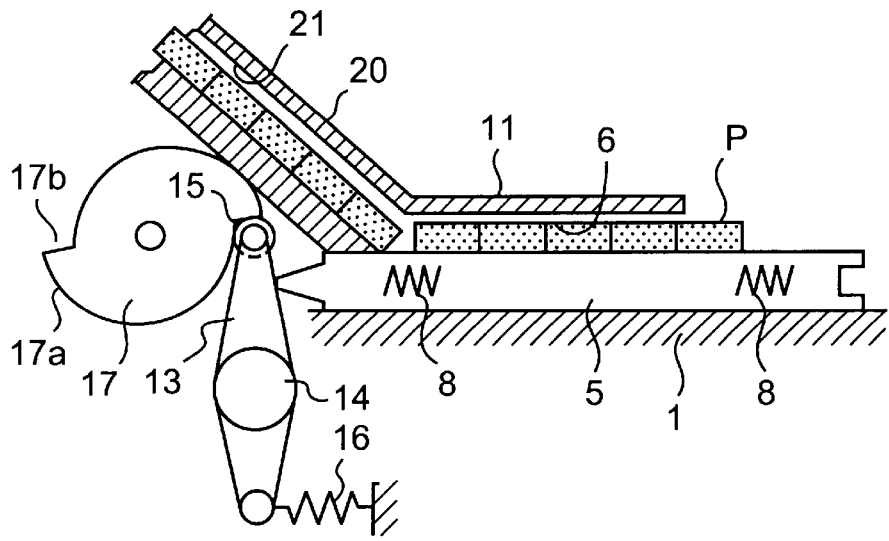
FIGS. 4A, 4B, and 4C are explanatory views showing the operation principle of the part transfer apparatus shown in FIG. 1.

FIG. 4A shows an initial position, where the cam follower 15 is placed in the low portion 17b of the cam 17. Therefore, the blade 5 urged backward by the springs 8 is in the rear position.

Figure 4B:
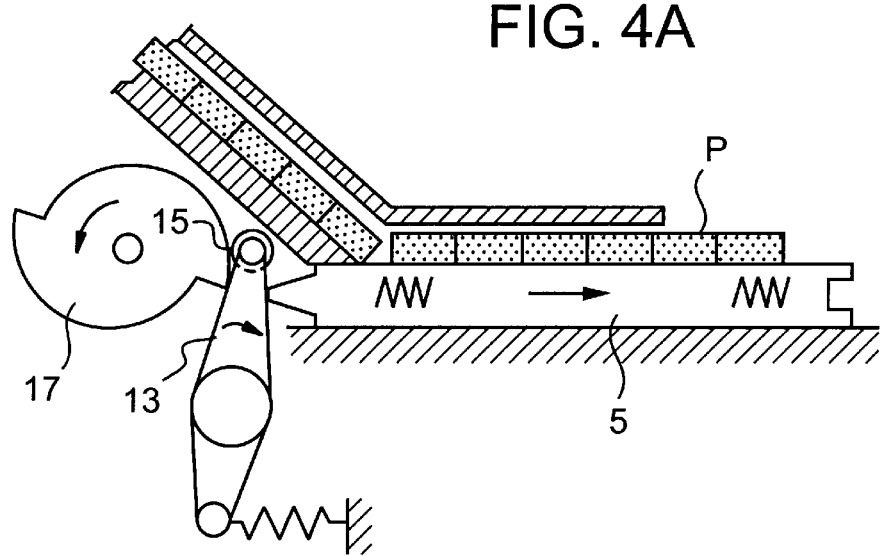

Next, when the cam 17 turns in the direction of the arrow, the cam follower 15 runs onto the high portion 17a of the cam 17, as shown in FIG. 4B, and the cam lever 13 slowly pivots forward. With this, the blade 5 in contact with the cam lever 13 also advances at low speed. When the blade 5 thus advances at low speed, parts P placed thereon are carried forward together, and parts P in the chute groove 21 enter the guide groove 6 by a predetermined number. If the moving pitch of the blade 5 corresponds to a part, the parts P in the chute groove 21 enter the guide groove 6 one by one.

Figure 4C:
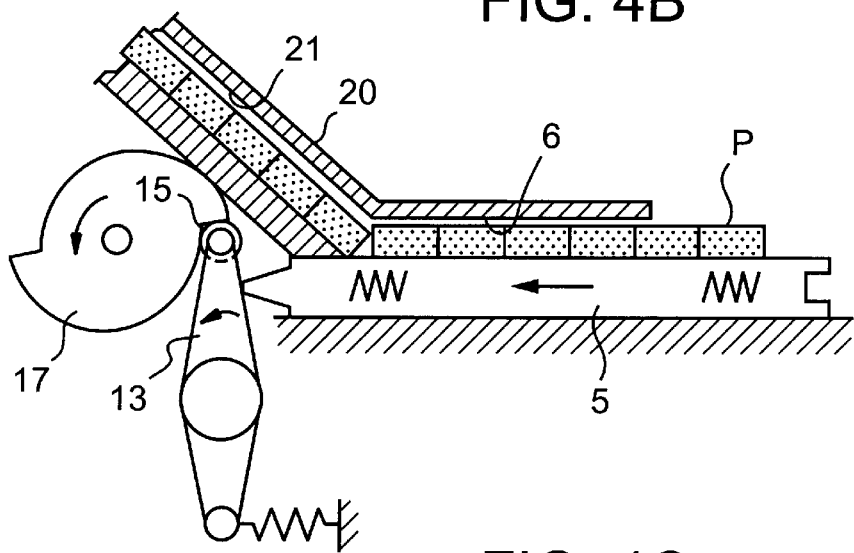

When the cam 17 turns further and the cam follower 15 drops to the low portion 17b of the cam 17, as shown in FIG. 4C, the cam lever 13 pivots backward at high speed, and the blade 5 in contact therewith also reverses at high speed. For this reason, the blade 5 and the parts P slip relative to each other, and the parts P are left at the front position. Even if the parts P in the guide groove 6 attempt to move backward with this reversing of the blade 5, the movement is inhibited by the part P in the chute groove 21 in contact ü with the last part P in the guide groove 6.

Since the cam follower 15 rolls on the peripheral surface of the cam 17, as described above, there is little friction between the cam 17 and the cam lever 17. Moreover, since the cam lever 13 and the blade 5 hardly slide with respect to each other, they are subjected to little wear. Furthermore, since only the horizontal motion of the cam lever 13 is transmitted to the blade 5, the blade 5 does not vibrate vertically. Therefore, the parts P on the blade 5 can be stably transferred without popping out.

Figure 5:
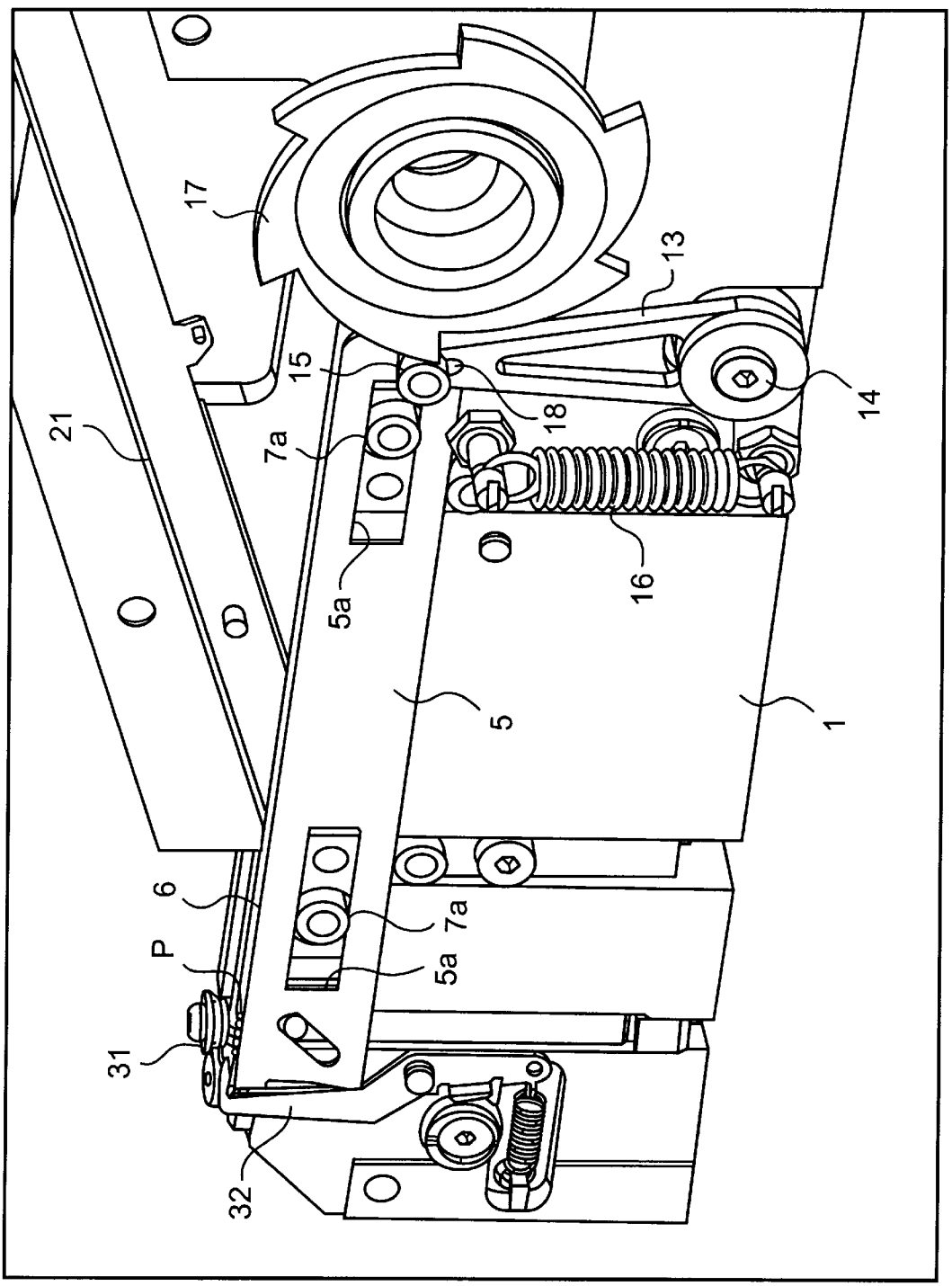
FIG. 5 is a partial perspective view of a part transfer apparatus according to a second embodiment of the present invention.
Figure 6:
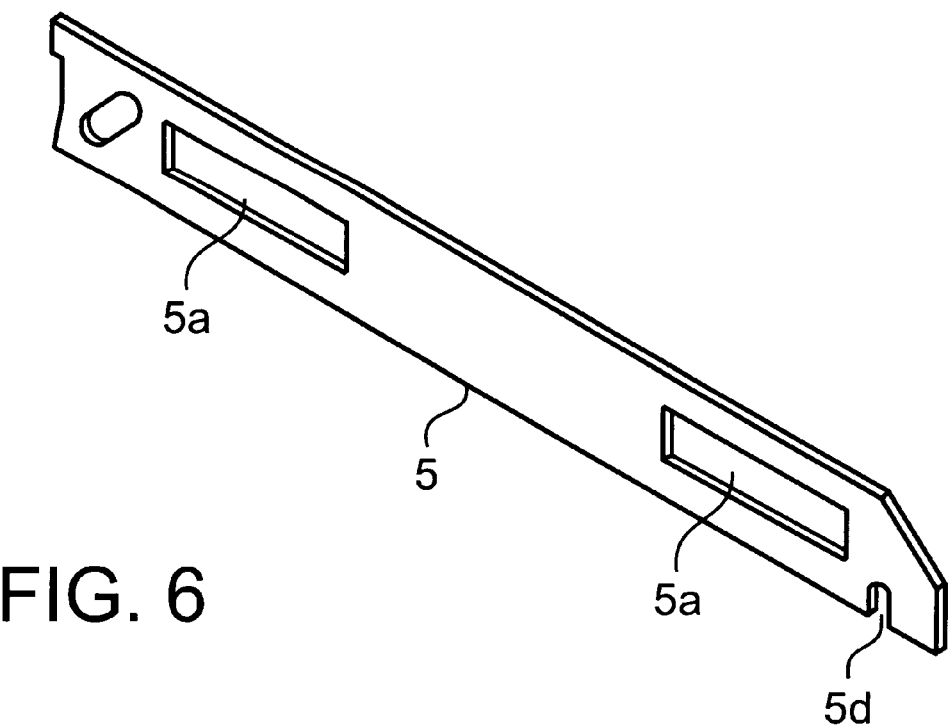
FIG. 6 is a perspective view of a blade in the part transfer apparatus shown in FIG. 5.
Figure 7:
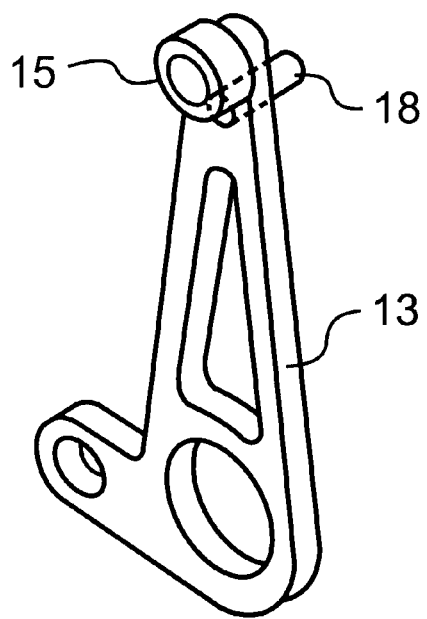
FIG. 7 is a perspective view of a cam lever in the part transfer apparatus shown in FIG. 5.

FIGS. 5 to 7 show a second embodiment of the present invention. The same components as those in the first embodiment are denoted by the same numerals, and description thereof is omitted.

This embodiment is different from the first embodiment (see FIGS. 1 and 2) in that a blade is placed on the opposite side of the main body 1.

A blade 5 has guide slots 5a extending in the longitudinal direction, with which guide rollers 7a mounted on the main body 1 are engaged so as to move therealong in the longitudinal direction. The blade 5 also has, at its rear bottom, a slot (engaging hole) 5d extending in the vertical direction, as shown in FIG. 6. While the slot 5d is open downward in this embodiment, it may be enclosed. The blade 5 does not have springs, which is different from the first embodiment.

A cam lever 13 is shaped like a bell crank, as shown in FIG. 7. The cam lever 13 has a spring 16 fixed to one end thereof, and a cam follower 15 attached to the other end thereof. Therefore, the cam follower 15 is always in contact with the peripheral surface of a cam 17. A pin 18 is mounted near the other end of the cam lever 13 so as to be slidably engaged with the slot 5d of the blade 5, and transmits only the horizontal motion of the cam lever 13 to the blade 5.

While the cam 17 of this embodiment includes more high and low portions than those in the first embodiment, it operates in the same manner.

In the above-described configuration, since the blade 5 and the cam lever 13 are connected via the pin 18 and the slot 5d, when the cam lever 13 pivots forward, the blade 5 also moves forward in the horizontal direction; in contrast, when the cam lever 13 is pivoted backward by the spring 16, the blade 5 also moves backward in the horizontal direction in synchronization therewith. Since springs for urging the blade 5 backward can be omitted in this embodiment, load is not imposed on the connecting portion between the pin 18 and the slot 5d, which prevents the connecting portion from wear.

The cam may be rotated intermittently instead of being rotated continuously.

The conveyer member is not limited to a blade, and may be formed of any member that can form the bottom face of the guide groove and can move forward and backward. Since the use of a thin member, such as a blade, achieves weight reduction, it is possible to reduce the influence of inertia during reciprocating motion.

The part transfer apparatus of the present invention can transfer not only chip parts, but also any parts that can be aligned and conveyed in the guide groove.

As is clear from the above description, according to the part transfer apparatus of the present invention, a difference in speed is made between advance and reverse of the conveyor member in order to change the frictional force, whereby parts are conveyed in one direction. Therefore, the parts need not be restrained, and do not suffer significant damage. Furthermore, the parts are unlikely to be caught during travel due to contaminants or static electricity, which improves reliability. Moreover, since the conveyor member can be made of a hard material, such as metal, without being formed of a flexible member, such as a belt, rigidity and durability thereof are improved. Since the conveyor member is only driven in a reciprocating manner, the driving mechanism can be simplified and produced at low cost. In addition, parts can be transferred at a higher speed than in the conventional intermittent driving, and problems are reduced.

Since the rotational motion of the cam is converted into the pivotal motion of the cam lever, and further into the reciprocating motion of the blade, small forces acting at right angles to the moving direction of the conveyor member do not act on the conveyor member, whereby vertical vibration of the conveyor member is prevented. For this reason, parts laid on the conveyor member can be prevented from being lifted and popped off, and can be transferred stably.

Since the amount of sliding between the conveyor member and the cam lever is small, wear can be reduced, compared with a case in which the cam and the conveyor member are in direct contact with each other.

Furthermore, the stroke of the conveyor member can be changed by changing the position of engagement between the cam lever and the conveyor member while using the same cam, which increases the degree of freedom of design.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A part transfer apparatus comprising:
   a guide groove for aligning and guiding parts;
   a conveyor member disposed at the bottom of said guide groove so as to move forward and backward in the direction of said groove; and
   driving means for conveying parts laid on the top face of said conveyor member forward by reciprocally driving said conveyor member so that the speed of backward movement is higher than the speed of forward movement,
   wherein said driving means comprises:
      a cam to be turned in a fixed direction;
      a pivoting cam lever in contact with the peripheral surface of said cam so as to convert the displacement of the peripheral surface of said cam into the forward and backward movement of said conveyor member; and
      a spring continuously urging or pulling said conveyor member or said cam lever backward.

2. A part transfer apparatus according to claim 1, wherein said spring urges said conveyor member backward so that the rear end of said conveyor member is made to contact the front side of said cam lever by the urging force of said spring.

3. A part transfer apparatus according to claim 1, wherein one of said cam lever and said conveyor member has an engaging pin, the other has an engaging hole to be slidably engaged with said engaging pin, and said spring pivotally urges said cam lever backward.

* * * * *